United States Patent
Fernandess et al.

(10) Patent No.: US 8,230,259 B2
(45) Date of Patent: Jul. 24, 2012

(54) AUTOMATIC ANALYSIS OF LOG ENTRIES THROUGH USE OF CLUSTERING

(75) Inventors: Yaacov Fernandess, Jerusalem (IL); Ohad Rodeh, Jerusalem (IL); Lavi Shpigelman, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 12/629,055

(22) Filed: Dec. 2, 2009

(65) Prior Publication Data

US 2011/0131453 A1  Jun. 2, 2011

(51) Int. Cl.
    G06F 11/00 (2006.01)
(52) U.S. Cl. ........... 714/20; 709/224; 714/4.1; 714/4.4; 714/43; 714/47.1; 714/47.2; 714/48
(58) Field of Classification Search ............... 714/4.1, 714/4.4, 20, 43, 47.1, 47.2, 48
    See application file for complete search history.

(56) References Cited

U.S. PATENT DOCUMENTS

| | | | |
|---|---|---|---|
| 5,539,877 A * | 7/1996 | Winokur et al. ........... 714/26 |
| 5,847,972 A | 12/1998 | Eick et al. | |
| 6,138,250 A | 10/2000 | Nouri et al. | |
| 6,343,236 B1 * | 1/2002 | Gibson et al. ............. 700/79 |
| 6,650,949 B1 * | 11/2003 | Fera et al. ................ 700/79 |
| 6,725,398 B1 * | 4/2004 | Varma et al. ............. 714/25 |
| 6,981,182 B2 * | 12/2005 | Roddy et al. ............ 714/47.3 |
| 7,124,060 B1 * | 10/2006 | Eriksson et al. .......... 702/185 |
| 7,409,604 B2 * | 8/2008 | Murphy et al. ........... 714/48 |
| 7,451,210 B2 * | 11/2008 | Gupta et al. ............. 709/224 |
| 7,469,239 B2 * | 12/2008 | Musman .................. 706/46 |
| 7,490,081 B2 | 2/2009 | Best et al. | |
| 7,512,584 B2 | 3/2009 | Keith, Jr. | |
| 7,523,190 B1 * | 4/2009 | Bickerstaff et al. ........ 709/224 |
| 7,558,820 B2 | 7/2009 | Kimoto et al. | |
| 7,788,536 B1 * | 8/2010 | Qureshi et al. ........... 714/38.14 |
| 7,818,278 B2 * | 10/2010 | Padovitz et al. .......... 706/52 |
| 7,954,090 B1 * | 5/2011 | Qureshi et al. ........... 717/127 |
| 2003/0208706 A1 * | 11/2003 | Roddy et al. ............. 714/48 |
| 2004/0059966 A1 * | 3/2004 | Chan et al. ............... 714/48 |
| 2004/0220945 A1 * | 11/2004 | Pioli et al. ............... 707/100 |
| 2005/0188240 A1 * | 8/2005 | Murphy et al. ........... 714/4 |
| 2006/0036670 A1 * | 2/2006 | Musman ................. 709/202 |
| 2006/0037075 A1 * | 2/2006 | Frattura et al. .......... 726/22 |
| 2007/0300300 A1 | 12/2007 | Guo et al. | |
| 2009/0113246 A1 | 4/2009 | Sabato et al. | |

(Continued)

OTHER PUBLICATIONS

Tao Li and Wei Peng, "A Clustering Model Based on Matrix Approximation With Applications to Cluster System Log Files", School of Computer Science, Florida International University, 11200, SW 8th street, Miami, FL, 33199, 2005. URL: http://www.springerlink.com/content/f8748604m20020lr/.

(Continued)

*Primary Examiner* — Robert Beausoliel, Jr.
*Assistant Examiner* — Joshua P Lottich
(74) *Attorney, Agent, or Firm* — Ziv Glazberg

(57) ABSTRACT

A set of log entries is automatically inspected to determine a bug. A training set is utilized to determine clustering of log identifications. Log entries are examined in real-time or retroactively and matched to clusters. Timeframe may also be matched to a cluster based on log entries associated with the timeframe. Error indications may be outputted to a user of the system in respect to a log entry or a timeframe.

12 Claims, 4 Drawing Sheets

U.S. PATENT DOCUMENTS

2010/0306599 A1* 12/2010 Cota-Robles et al. .......... 714/48
2011/0065424 A1* 3/2011 Estevez et al. ............. 455/414.3
2011/0238781 A1* 9/2011 Okun et al. ................... 709/217

OTHER PUBLICATIONS

Barbara Catania and Anna Maddalena, "A Framework for Cluster Management", Dipartimento di Informatica e Scienze dell'Informazione, Universit'a degli Studi di Genova (Italy), 2004. URL:http://www.springerlink.com/content/9clf19vwda4r6g8j/fulltext.pdf.

N. Slonim, G. Singh Atwal, G. Tkacik, and W. Bialek. "Information-based clustering", Proc Natl Acad Sci USA, 102 (51):18297-18302, Dec. 2005.

* cited by examiner

| 402 | 404 | 406 | 408 |
|---|---|---|---|
| 00:00:19.54 | S0146779 | 00000000 | +ITP077I NETWORK DB2G36 MESSAGE RATES 846 RECEIVED, 833 SENT |
| 00:00:19.57 | J0006504 | 00000201 | $HASP100 PZ016 ON INTRDR FROM J0135714 |
| 00:00:19.58 | J0006504 | 00000200 | IRR010I USERID SETUP IS ASSIGNED TO THIS JOB |
| 00:00:19.62 | J0006504 | 00000201 | ICH70001I SETUP LAST ACCESS AT 00:00:04 ON THURSSAY |
| . | . | . | . |
| . | . | . | . |
| . | . | . | . |

AUTOMATIC ANALYSIS OF LOG ENTRIES THROUGH USE OF CLUSTERING

BACKGROUND

The present disclosure relates to analysis of log files, and to automatic analysis of log entries, in particular.

It is common that a computer system, such as a computer server, log information during the operation of the computer system. The computer system may generate log files, comprising log entries. Each log entry may indicate an operation performed by the computer system, such as for example storing of data, computation of a variable, initialization of a module or a sub-module, raising an exception or an interrupt or the like. Log files may contain a large amount of log entries. In some cases, such as for example a mainframe server, millions of log entries may be appended on a daily basis to a log file.

The log files may be utilized to detect bugs in the computer system, to enable a person to fix the bug or to avoid the bugs repercussion, and the like. In some cases, a log entry may indicate errors in the execution of a system process. The log file may be inspected by a user, such as Quality Assurance personnel, a developer, a technician or the like for the aforementioned purposes.

BRIEF SUMMARY OF THE INVENTION

One exemplary embodiment of the disclosed subject matter is a computerized system comprising: an input module configured to obtain log entries; a learning module configured to determine a matching function based on a first portion of the log entries, the matching function is configured to match a log entry with an at least one cluster; a cluster associator configured to associate a second portion of the log entries with the at least one cluster, the cluster associator is configured to utilize the matching function determined by the learning module; an output module configured to provide an indication referring to the at least one cluster associated with the first portion of the log entries and the second portion of the log entries; and a processor.

Another exemplary embodiment of the disclosed subject matter is a method in a computerized environment, the method comprising: obtaining log entries; determining a matching function between a log entry and an at least one cluster based on a first portion of the log entries; associating a second portion of the log entries with the at least one cluster, based on the matching function; and providing an indication referring to the at least one cluster associated with the first portion of the log entries and the second portion of the log entries; whereby the first portion of log entries and the second portion of log entries are transformed to an at least one indication of the at least one cluster.

Yet another exemplary embodiment of the disclosed subject matter is a computer program product comprising: a computer readable media; first program instruction for obtaining log entries; second program instruction for determining a matching function between a log entry and an at least one cluster based on a first portion of the log entries; third program instruction for associating a second portion of the log entries with the at least one cluster, based on the matching function; fourth program instruction for providing an indication referring to the at least one cluster associated with the first portion of the log entries and the second portion of the log entries; wherein the first, second, third and fourth program instructions are stored on the computer readable media.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 4 shows a log file in accordance with some exemplary embodiments of the disclosed subject matter.

DETAILED DESCRIPTION

Figure 1:
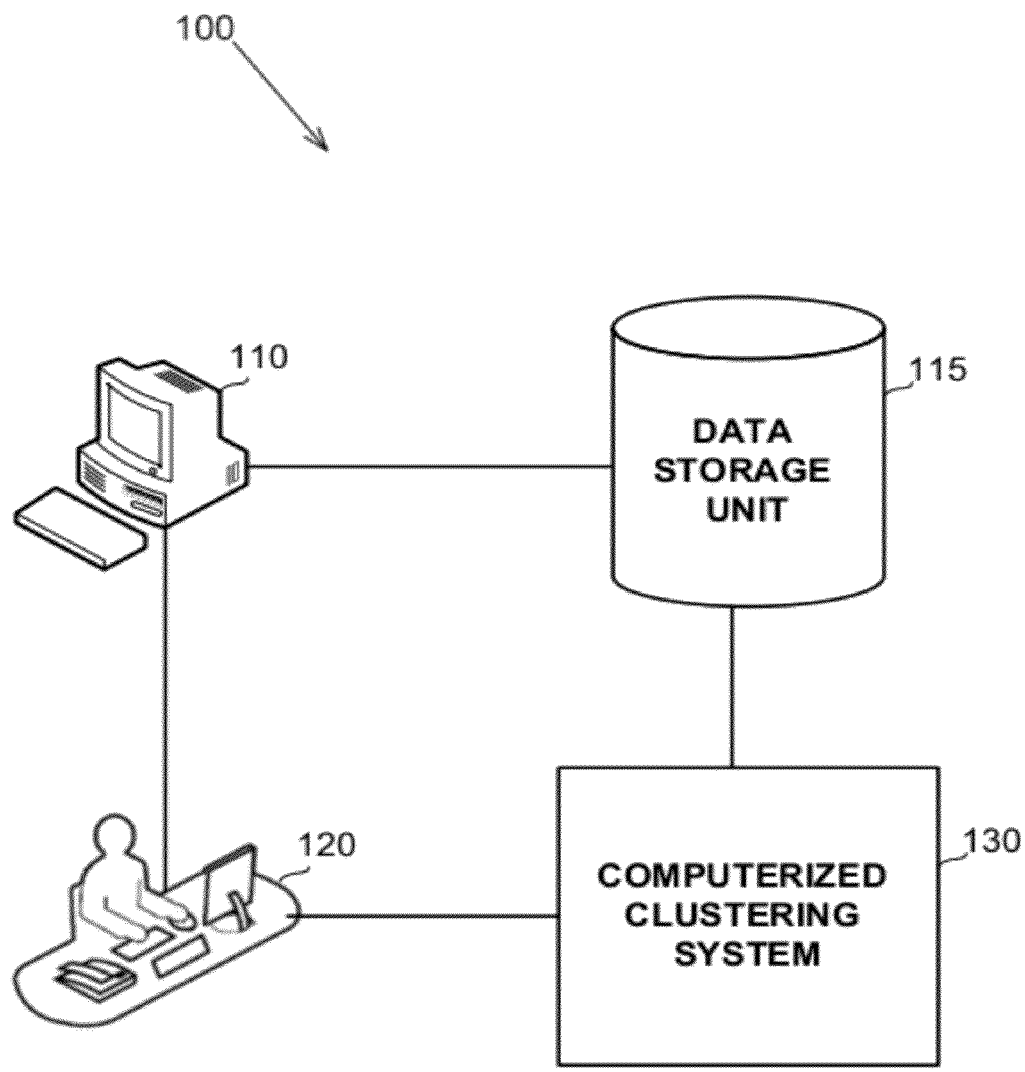
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to automatically review log entries. Another technical problem dealt with by the disclosed subject matter is to analyze log files in order to detect a failure event. A failure event may be associated with some log entries. Yet another technical problem dealt with by the disclosed subject matter is to automatically detect failure events based on log entries, without the use of manually defined rules. Yet another technical problem dealt with by the disclosed subject matter is to automatically determine which log entries are associated with a failure event. Yet another technical problem dealt with by the disclosed subject matter is to automatically detect one or more events that occurred in the computer system in a timeframe.

One technical solution is to utilize machine learning algorithms to automatically associate log entries with events, including failure events. Another technical solution is to obtain a training dataset of log entries, which may be used in a training phase. Yet another technical solution is to use a clustering algorithm, in order to group together log entries that are associated with one another, such as stemming from a single event or associated with a bug in the computer system. Yet another technical solution is to associate an operation of the computer system in a timeframe based on log entries that are associated with the timeframe, such as log entries that were generated, emitted or the like during the timeframe. Yet another technical solution is to label a cluster in respect to a meaning of a cluster. The labeling may be performed automatically. Yet another technical solution is to label the timeframe based on the label of the cluster.

One technical effect of utilizing the disclosed subject matter is grouping together log entries with a common characteristic. Another technical effect of utilizing the disclosed subject matter is grouping together log entries having similar patterns of appearance. Yet another technical effect of utilizing the disclosed subject matter is an automatic detection of exceptional operation of a computer system. Yet another technical effect of utilizing the disclosed subject matter is listing unique identifiers of log entries identified in one or more timeframes.

Referring now to FIG. 1 showing a computerized environment in which the disclosed subject matter is used, in accordance with some exemplary embodiments of the subject matter. A computerized environment 100 may comprise a computer system 110, such as a mainframe computer system, a standalone personal computer system, a networked distributed computer system or the like. The computer system 110 may emit log entries during operation. The log entries may be stored in one or more log files, log databases or the like. The log entries may be stored within a data storage unit 115, such as for example a storage server, a Redundant Array of Inexpensive Disks (RAID), a hard disk drive, a removable media such as a Compact Disc (CD), a Random Access Memory (RAM), a flash memory, a magnetic storage device or the like.

The computerized environment 100 may further comprise a computerized clustering system 130. The computerized clustering system 130 may receive, retrieve or otherwise obtain log entries. A first portion of the log entries may be utilized by the computerized clustering system 130 in a training phase. A second portion of the log entries may be analyzed by the computerized clustering system 130. The computerized clustering system 130 may be further configured to provide an operation output to a user, such as a user 120.

The user 120 may be a developer, a Quality Assurance (QA) person, a technician and the like. The user 120 may inspect the log in order to determine whether a failure event occurred. The user 120 may provide input to the computerized clustering system 130. In some exemplary embodiments, the user 120 may be an end-user of the computer system 110. The user 120 may operate the computer system 110.

Figure 2:
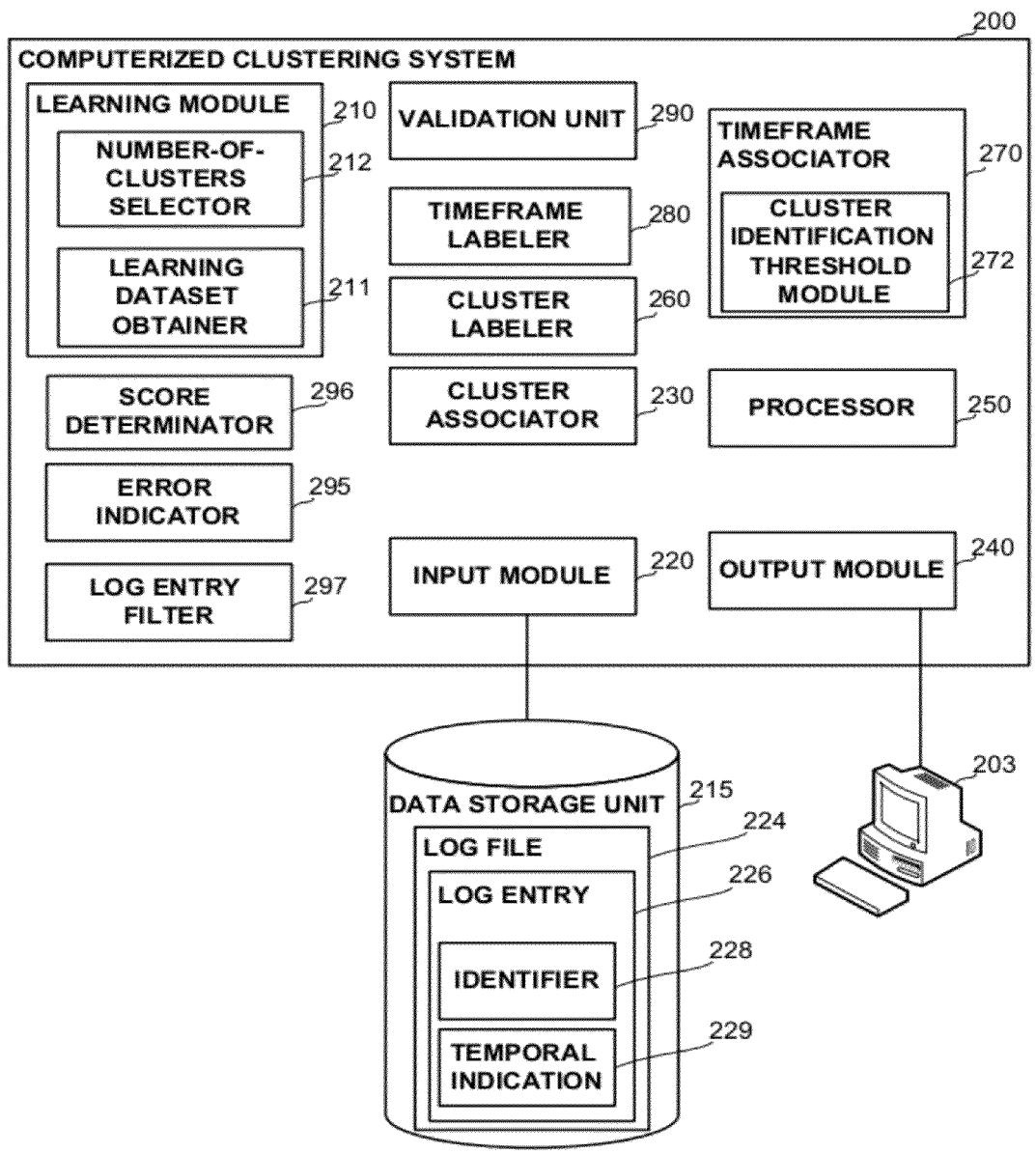
FIG. 2 shows a block diagram of a computerized clustering system in accordance with some exemplary embodiments of the disclosed subject matter.

Referring now to FIG. 2 showing a block diagram of a computerized clustering system in accordance with some exemplary embodiments of the disclosed subject matter. A computerized clustering system 200 may comprise a learning module 210, an input module 220, a cluster associator 230 and an output module 240.

The input module 220 may be configured to obtain a log entry 226 from a data storage unit 215, such as 115 of FIG. 1. The data storage unit 215 may comprise a log file 224. The log file 224 may comprise the log entry 226. In some exemplary embodiments, the log file 224 may comprise multiple log entries. In some exemplary embodiments, the log entry 226 may be a line of text in the log file 224. The log entry 226 may comprise an identifier 228 and a temporal indication 229. The identifier 228 may stem from an event and may be associated to a module. The temporal indication 229 represents a timestamp of the event.

The learning module 210 may be configured to determine a matching function between a log entry, such as for example the log entry 226, and a cluster. The cluster may logically group log entries that have a likelihood to appear together or may stem from an event. The event may be for example a computerized command or process. For example, the event may be an initialization of a module command, a module shutdown command, a reboot process, a shutdown process or the like. The event may also be a communication with a specific module, either internal to the computerized system or external thereto. The specific module may be a printer, a software module, an electrical connection having one or more connectors, a portable computer disk, a hard disk or the like. The matching function may match a log entry with a cluster based on an identifier comprised by the log entry.

In some exemplary embodiments, the matching function may be determined based on algorithms such as for example, k-means clustering, iClust, Sequential Information Bottleneck clustering or the like. In some exemplary embodiments, the learning module 210 is utilized in a training phase to determine the matching function.

The learning module 210 may be configured to utilize several log entries, also referred to as training set, obtained by the input module 220, in order to automatically learn a pattern of appearances of log entries. The training set may be obtained by a learning dataset obtainer 211 as is disclosed below. The training set may be obtained by the input module 220 from the data storage unit 215. The training set may be comprised by one or more log files. In some exemplary embodiments, the training set may be obtained from a predetermined storage unit, such as the data storage unit 215, a former data storage unit, a history data storage unit or the like. Learning of the pattern may be implemented by a machine learning algorithm. In some exemplary embodiments, the computerized clustering system 200 may utilize the machine learning algorithms for the operation of the clustering system 200. For example, the learning module 210 may automatically learn to group log entries that have a likelihood to appear together or may stem from an event, into a cluster based on the training set, such as for example comprised by the data storage unit 215.

In some exemplary embodiments of the disclosed subject matter, the matching function may be utilized in hard decision algorithm, in soft decision algorithm or the like. The hard decision algorithm may match a log entry with a cluster in a one-to-one manner, such that the log entry is matched with exactly one cluster. The soft decision algorithm may match more than a single cluster to a log entry. In some exemplary embodiments, the matching function may provide a matching value representing the probability that the log entry is associated with a cluster. The soft decision algorithm may utilize the matching value to determine possible clusters that are associated with the log entry.

The learning module 210 may further comprise a learning dataset obtainer 211. The learning dataset obtainer 211 may be configured to select the training set from log entries obtained by the input module 220. The training set may be utilized by the learning module 210. For example, the learning dataset obtainer 211 may choose log entries accumulated in a predetermined timeframe, such as last ninety days, log entries accumulated between two dates, log entries accumulated from the first operation of the system, log entries associated with a predetermined computerized system or the like. In some exemplary embodiments, the matching function may be recalculated by the learning module 210, for example, every predetermined time period, upon a user command or the like.

In some exemplary embodiments of the disclosed subject matter, the learning module 210 may further comprise a number-of-clusters selector 212. The number-of-clusters selector 212 may select a number-of-clusters utilized by the disclosed subject matter. The number-of-clusters may be predetermined or changed during operation of the computerized clustering system 200. The number-of-clusters may be determined manually by a user, by automated tools, rules, commands, or the like. The number-of-clusters may be limited by system preferences. The number-of-clusters may be calculated according to the number of log entries, time span in which the log entries were obtained and the like.

In some exemplary embodiments of the disclosed subject matter, the learning module 210 may arrange clusters in a hierarchical arrangement. The hierarchical arrangement may comprise a father cluster and a son cluster. The father cluster may represent a father event. The son cluster may represent a son event associated with the father event. The son event may represent a sub-event of the father event. For example the father event may represent a shutdown event of a system boot of a system. The son event may represent a program shutdown event of the system which is part of the system boot event.

The cluster associator 230 may be configured to associate a new log entry, such as for example the log entry 226, with a cluster. The new log entry may be a log entry that is not comprised by the training set. In some exemplary embodiments, the cluster associator 230 may determine whether to associate the new log entry with a cluster based on the matching function. In some cases, the cluster associator 230 may further associate a suspicious log entry with a predetermined cluster. The suspicious log entry may be, for example, a log entry that has infrequent appearance pattern or low correlation with other log entries. The suspicious log entry may be associated with an erroneous operation of a computerized system associated with the suspicious log entry. Association of several new log entries with the predetermined cluster may be indicative of an erroneous operation that may be reported to a user.

In some exemplary embodiments of the disclosed subject matter, the computerized clustering system 200 may further comprise a processor 250. The processor 250 may be utilized to perform computations required by the computerized clustering system 200 or any of it subcomponents. The processor 250 may be a Central Processing Unit (CPU), a microprocessor, an electronic circuit, an Integrated Circuit (IC) or the like.

In some exemplary embodiments of the disclosed subject matter, the computerized clustering system 200 may further comprise a cluster labeler 260. The cluster labeler 260 may be configured to label clusters. The cluster labeler 260 may label a cluster with a cluster label in accordance with an event that is associated with log entries matched with the cluster, such as for example an event that is expected to produce the log entries. In some exemplary embodiments, the cluster label is determined manually by a user, by an automated text summarization tool or the like. The cluster label may be for example, initialization of a component, shutdown of a module or the like. The cluster label may indicate the event associated with the cluster.

In some exemplary embodiments of the disclosed subject matter, the computerized clustering system 200 may further comprise a timeframe associator 270. The timeframe associator 270 may associate a timeframe with a cluster based on one or more new log entries associated with the timeframe. The one or more new log entries may comprise a temporal indication, such as 229, associated with the timeframe, such as a timestamp within the timeframe. The timeframe associator 270 may utilize the cluster associator 230 for determining whether the one or more new log entries are associated with a cluster, in order to determine whether to associate the timeframe to the cluster.

In some exemplary embodiments, the timeframe associator 270 may comprise a cluster identification threshold module 272. The cluster identification threshold module 272 may determine a cluster identification threshold. The timeframe associator 270 may compare the number of new log entries in a timeframe to the cluster identification threshold in order to determine whether to associate a cluster with the timeframe. The cluster identification threshold module 272 may determine the cluster identification threshold based on user input, parameters, rules or commands. The cluster identification threshold may be for example a threshold of at least twenty new log entries associated with a cluster, a threshold of eighty percent of new log entries associated with a cluster and the like.

In some exemplary embodiments of the disclosed subject matter, the computerized clustering system 200 may further comprise a timeframe labeler 280. The timeframe labeler 280 may be configured to associate a label with a timeframe based on a cluster label of a cluster associated with the timeframe. For example, the timeframe labeler 280 may utilize the timeframe associator 270 in order to determine which clusters are associated with a timeframe. The timeframe labeler 280 may utilize the cluster labeler 260 in order to determine the cluster label.

In some exemplary embodiments of the disclosed subject matter, the computerized clustering system 200 may further comprise a validation unit 290. The validation unit 290 may be configured to validate a determination by the timeframe associator 270. The validation unit 290 may validate the determination by comparing a first label associated with a timeframe by the timeframe labeler 280, to a second label associated with the timeframe, determined in a second manner, such as by a user, based on a second computerized clustering system 200, based on a recordation of an event by the computer system or the like.

In some exemplary embodiments of the disclosed subject matter, the computerized clustering system 200 may further comprise an error indicator 295. The error indicator 295 may be configured to determine whether a failure event is associated with a timeframe. A failure event may be associated with an at least one suspicious log entry. The at least one suspicious log entry may comprises a temporal indication, such as 229, associated with the timeframe. In some exemplary embodiments, the error indicator 295 may detect the at least one suspicious log entry based on the cluster that is associated thereto. For example, the cluster associated 230 may associate suspicious log entry with a predetermined cluster.

In some exemplary embodiments, the error indicator 295 may utilize a score determinator 296 to determine a score associated with the timeframe. The score may be indicative of a possibility that a failure event is associated with the timeframe. The score may be a summation of entry scores associated with log entries that are associated with the timeframe. The entry scores may be determined based on a rareness of a log entry. The entry score may be determined based on a statistical model, such as a Poisson model. The statistical model may be determined by the learning module 210 based on the training dataset. In some exemplary embodiments, a score above a predetermined threshold may be considered as an error that may be reported to a user. In some exemplary embodiments, the score may be reported to a user by the output module 240, such as for example by reporting a score between a predetermined range such as zero to hundred, presenting a timeframe in a color indicative of a score, such as color between green and red or the like. The user may utilize the score to asses a possibility of a failure in the timeframe.

In some exemplary embodiments, the score may be determined based upon entry scores associated with a portion of the log entries associated with the timeframe. A log entry filter 297 may determine the portion of the log entries. The log entry filter 297 may filter out a log entry associated with the timeframe and the cluster associated with the timeframe, such as the cluster determined by the timeframe associator 270. For example, the timeframe may be associated with ten log entries, seven of which are associated to a cluster. The timeframe associator 270 may therefore associate the timeframe with the cluster. The log entry filter 297 may filter out the seven log entries out of the ten log entries. The score determinator 296 may determine the score based on entry scores of three remaining log entries of the ten log entries. In some exemplary embodiments, filtering out a portion of the log entries may be beneficial as associating the timeframe with their associated cluster may suggest that they appeared because of a normal event. Some of the log entries associated with the normal event may be rare events. However, the fact that they appear in the timeframe may be explained by normal behavior and therefore the score may be indifferent to their respective log entries.

The output module 240 may be configured to provide an indication concerning which of the log entries are associated with each cluster based on the cluster associator 230. The output module 240 may be further configured to provide an indication of a failure event to an external device 203, based on the error indicator 295. The indication may be a summary file, an email, a pop up message or the like. In some exemplary embodiments, the output module 240 may provide a list of unique identifiers identified in one or more timeframes. The list may comprise a number of appearances identified for each identifier based on the log entries associated with the one or more timeframes. In some exemplary embodiments, the indication may be sent to an external device 203. The external device 203 may be for example a PC, a laptop, a Wi-Fi based apparatus, a mobile device or the like.

Figure 3:
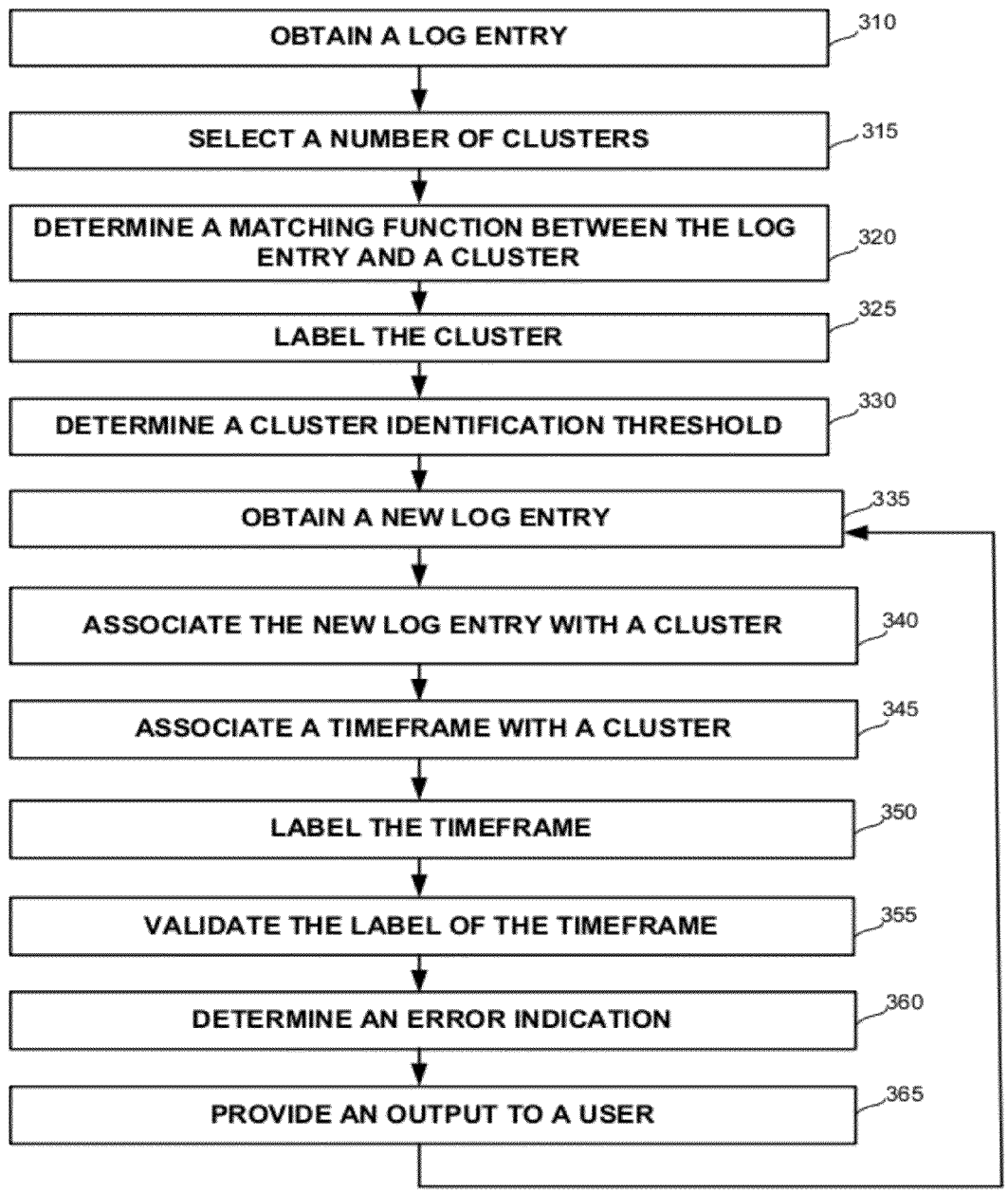
FIG. 3 shows a flowchart diagram of a method in accordance with some exemplary embodiments of the disclosed subject matter.

Referring now to FIG. 3 showing a flowchart diagram of a method in accordance with some exemplary embodiments of the disclosed subject matter.

In step 310, a log entry, such as log entry 226 of FIG. 2, is obtained. The log entry may be comprised by a training set which may be selected by a learning dataset obtainer, such as 211 of FIG. 2. The step of obtaining the log entry may be performed by an input module, such as 220 of FIG. 2.

In step 315, a number-of-clusters is selected. The step of selecting the number-of-clusters may be performed by a number-of-cluster selector, such as 212 of FIG. 2.

In step 320, a matching function between a log entry, such as 226 of FIG. 2, and a cluster is determined. The step of determining the matching function between the log entry and the cluster may be performed by a learning module, such as 210 of FIG. 2.

In some exemplary embodiments, some or all of the steps 310, 315, 320 may be performed a multiple number of times. The steps 310, 315, 320 may be performed periodically, such as for example every thirty days.

In step 325, the cluster is labeled. The step of labeling the cluster may be performed by a cluster labeler, such as 260 of FIG. 2. The cluster may be labeled based on user input. The cluster may be labeled automatically, such as for example by summarization tools. The step 325 may be performed periodically, such as for example, every time the step 320 is performed.

In step 330, a cluster identification threshold is determined. The step of determining the cluster identification threshold may be performed by a cluster identification threshold module, such as 272 of FIG. 2. In some exemplary embodiments, the step 330 may be performed more than once.

In step 335, a new log entry, such as 226 of FIG. 2, is obtained. The new log entry may be a log entry that is not comprised by the training set. The step of obtaining the new log entry may be performed by an input module, such as 220 of FIG. 2. The new log entry may be obtained from a log file or other repository. In some exemplary embodiments, the log file may be updated by the computer system during performance of the method. For example, additional log entries may be generated during performance of steps 335, 340 or the like and appended to the log file. The appended log entries may be processed by the disclosed subject matter, for example by step 335 in a successive iteration.

In step 340, the new log entry is associated with a cluster. The step of associating the new log entry with the cluster may be performed by a cluster associator, such as 230 of FIG. 2. In some exemplary embodiments, a new log entry may be associated with more than one cluster, such as for example in case of soft decision algorithms. The association may be performed based on the matching function determined in step 320.

In step 345, a timeframe is associated with a cluster. The step of associating the timeframe with the cluster may be performed by a timeframe associator, such as 270 of FIG. 2. In some exemplary embodiments, the step of associating the timeframe with the cluster may be performed after obtaining all log entries associated with the timeframe. A log entry may be deemed associated with a timeframe, for example, in case a temporal indication of the log entry is associated with the timeframe, such as for example the temporal indication is a timestamp that is associated with a time within the timeframe. In some exemplary embodiments, associating a timeframe with a cluster may be performed based on a number of log entries associated with the timeframe and a cluster.

In step 350, the timeframe is labeled. The step of labeling the timeframe may be performed by a timeframe labeler, such as 280 of FIG. 2.

In step 355, the label of the timeframe is validated. The step of validating the label of the timeframe may be performed by a validation unit, such as 290 of FIG. 2. In some exemplary embodiments, the step 355 of validating the label of the timeframe may be performed upon a user request.

In step 360, an error indication is determined. The step of determining the error indication may be performed by an error indicator, such as 295 of FIG. 2. In some exemplary embodiments, step 360 may comprise determining a score of a timeframe. The score of the timeframe may be determined by a score determinator, such as 296 of FIG. 2. In some exemplary embodiments, the score may be determined based on entry scores of log entries associated with the timeframe. Score determination may be performed in response to filtering a portion of the log entries associated with the timeframe, such as performed by a log entry filter, such as 296 of FIG. 2. It will be noted that a log entry that is filtered out may be considered not to be associated with the timeframe.

In step 365, an output is provided to a user. The step of providing the output to the user may be performed by an output module, such as 240 of FIG. 2. In some exemplary embodiments, step 365 may be performed only in case a predetermined amount of log entries, timeframes or the like were processed, such as for example a thousand log entries or ten timeframes.

In some exemplary embodiments, the steps 335, 340, 345, 350, 355, 360, 365 or a portions thereof may be performed iteratively. For example, the steps 335, 340, 345, 350, 355, 360, 365 may be performed in a loop. The loop may be performed until all log entries have been processed. In some exemplary embodiments, the loop may be an endless loop that continues to operate, as long as the computer system may generate new log entries. In other exemplary embodiment, the loop may operate according to a predetermined sequence. In other exemplary embodiment, each step of the loop may be performed multiple number of times.

Referring now to FIG. 4 showing a log file in accordance with some exemplary embodiments of the disclosed subject matter.

A log file 400, such as 224 of FIG. 2, may comprise log entries 410, 420, 430, 440. The log file 400 may be viewed as a table comprising of rows and columns. A row may represent a log entry. A column may represent a characteristic of the log entry. A column 402 may represent a timestamp of an event that is associated with the log entry. For example, the log entry 410 may comprise a timestamp of 00:00:19.54. The column 402 may represent the temporal indication 229 of FIG. 2. A column 404 may represent a module that generated the log entry. For example, the log entry 420 may have been generated by a module named "J0006504". A column 406 may represent a message ID number. The message ID number may be the identifier 228 of FIG. 2. It will be noted that in an identifier may appear in several log entries. For example, the log entries 420 and 440 have a same message ID number: "00000201". A column 408 may represent a message text. The message text may include information useful to understand an operation of a module that generated the log entry. In some exemplary embodiments, text summarization tools may utilize the message text of a log entry in order to determine labels.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method in a computerized environment, said method comprising:
    obtaining log entries;
    determining a matching function between a log entry and an at least one cluster based on a first portion of the log entries;
    associating a second portion of the log entries with the at least one cluster, based on the matching function;
    associating at least one timeframe with the at least one cluster;
    labeling a portion of the at least one timeframe; and
    providing an indication referring to the at least one cluster associated with the first portion of the log entries and the second portion of the log entries;
    whereby the first portion of the log entries and the second portion of the log entries are transformed to an at least one indication of the at least one cluster.

2. The method of claim 1 further comprising validating the association of at least one label with the portion of the at least one timeframe.

3. The method of claim 1 further comprising:
    determining a possibility of a failure event associated with the at least one timeframe; and
    providing an indication associated with the failure event.

4. The method of claim 3 further comprises:
    filtering a portion of the log entries associated with the at least one timeframe; and
    determining a score of the at least one timeframe; and wherein the score is indicative of the possibility of the failure event.

5. A computerized apparatus, the apparatus comprising a hardware processor which is arranged to:
    obtain log entries;
    determine a matching function between a log entry and an at least one cluster based on a first portion of the log entries;
    associate a second portion of the log entries with the at least one cluster, based on the matching function;
    associate at least one timeframe with the at least one cluster;
    label a portion of the at least one timeframe; and
    provide an indication referring to the at least one cluster associated with the first portion of the log entries and the second portion of the log entries;
    whereby the first portion of the log entries and the second portion of the log entries are transformed to an at least one indication of the at least one cluster.

6. The apparatus of claim 5, wherein said hardware processor is further arranged to validate the association of at least one label with the portion of the at least one timeframe.

7. The apparatus of claim 5, wherein said hardware processor is further arranged to:
    determine a possibility of a failure event associated with the at least one timeframe; and
    provide an indication associated with the failure event.

8. The apparatus of claim 7, wherein said hardware processor is further arranged to:
    filter a portion of the log entries associated with the at least one timeframe; and
    determine a score of the at least one timeframe; and wherein the score is indicative of the possibility of the failure event.

9. A computer program product, said computer program product comprising a non-transitory computer readable medium, in which computer instructions are stored, which instructions, when read by a computer, cause the computer to:
    obtain log entries;
    determine a matching function between a log entry and an at least one cluster based on a first portion of the log entries;
    associate a second portion of the log entries with the at least one cluster, based on the matching function;
    associate at least one timeframe with the at least one cluster;
    label a portion of the at least one timeframe; and
    provide an indication referring to the at least one cluster associated with the first portion of the log entries and the second portion of the log entries;
    whereby the first portion of the log entries and the second portion of the log entries are transformed to an at least one indication of the at least one cluster.

10. The computer program product of claim 9, wherein said instructions, when read by the computer, cause the computer to: validate the association of at least one label with the portion of the at least one timeframe.

11. The computer program product of claim 9, wherein said instructions, when read by the computer, cause the computer to:
    determine a possibility of a failure event associated with the at least one timeframe; and
    provide an indication associated with the failure event.

12. The computer program product of claim 11, wherein said instructions, when read by the computer, cause the computer to:
    filter a portion of the log entries associated with the at least one timeframe; and
    determine a score of the at least one timeframe; and wherein the score is indicative of the possibility of the failure event.

* * * * *